(12) United States Patent
Yamada et al.

(10) Patent No.: US 8,586,158 B2
(45) Date of Patent: Nov. 19, 2013

(54) DECORATED PLASTIC PACKAGE

(75) Inventors: Toshiki Yamada, Yokohama (JP); Ken Takenouchi, Yokohama (JP); Atsushi Kikuchi, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 952 days.

(21) Appl. No.: 10/556,512

(22) PCT Filed: May 14, 2004

(86) PCT No.: PCT/JP2004/006882
§ 371 (c)(1),
(2), (4) Date: Nov. 14, 2005

(87) PCT Pub. No.: WO2004/101270
PCT Pub. Date: Nov. 25, 2004

(65) Prior Publication Data
US 2006/0263554 A1 Nov. 23, 2006

(30) Foreign Application Priority Data

May 14, 2003 (JP) .................................. 2003-135467
Sep. 10, 2003 (JP) .................................. 2003-318365
Mar. 10, 2004 (JP) .................................. 2004-067598

(51) Int. Cl.
*B32B 1/02* (2006.01)
(52) U.S. Cl.
USPC .................. 428/35.7; 428/34.1; 428/36.6
(58) Field of Classification Search
USPC ........... 428/34.1, 35.7, 36.4, 36.5, 36.6, 36.7, 428/36.8
See application file for complete search history.

(56) References Cited

U.S. PATENT DOCUMENTS

| 3,711,176 | A | * | 1/1973 | Alfrey et al. ................. 359/359 |
| 3,894,487 | A | | 7/1975 | Miller |
| 4,307,137 | A | * | 12/1981 | Ota et al. ..................... 428/35.7 |
| 4,719,069 | A | * | 1/1988 | Reymann et al. ............. 264/296 |
| 4,948,641 | A | * | 8/1990 | Shantz et al. ................. 428/35.7 |
| 5,122,906 | A | | 6/1992 | Wheatley |
| 5,431,291 | A | * | 7/1995 | LaBombarbe, Jr. ........... 215/44 |
| 5,462,278 | A | | 10/1995 | Valyi ........................... 273/138.1 |
| 5,807,497 | A | * | 9/1998 | Gailberger et al. ......... 252/299.1 |
| 6,569,593 | B2 | * | 5/2003 | Bourdelais et al. ........... 430/201 |
| 6,706,357 | B2 | * | 3/2004 | Sugimura et al. ............. 428/60 |

FOREIGN PATENT DOCUMENTS

| JP | S59-229318 | A | 12/1984 |
| JP | 61-227098 | | 10/1986 |
| JP | H02-32946 | | 2/1990 |
| JP | H03-256800 | A | 11/1991 |
| JP | H05-92657 | A | 4/1993 |
| JP | 05-193040 | | 8/1993 |
| JP | 05-338638 | | 12/1993 |
| JP | H06-258509 | A | 9/1994 |
| JP | H07-16924 | A | 1/1995 |
| JP | 08/080928 | | 3/1996 |
| JP | H08-104314 | | 4/1996 |
| JP | 10-250741 | | 9/1998 |

(Continued)

*Primary Examiner* — Walter B Aughenbaugh
(74) *Attorney, Agent, or Firm* — Manabu Kanesaka

(57) ABSTRACT

There is here disclosed a plastic package (1) which has a thin-film layered structure (2) constituted of substances having different refractive indices and which is colored by an interference effect due to the thin-film layered structure (2). The plastic package is characterized in that, on a part of the surface of the plastic package, portions which are different in optical characteristics from the surface are periodically arranged.

5 Claims, 8 Drawing Sheets

(56) References Cited

FOREIGN PATENT DOCUMENTS

| | | |
|---|---|---|
| JP | 11-100019 | 4/1999 |
| JP | 2000-246829 | 9/2000 |
| JP | 2001-191692 A | 7/2001 |
| WO | 95/21057 | 8/1995 |
| WO | 00/29212 | 5/2000 |

* cited by examiner

DECORATED PLASTIC PACKAGE

TECHNICAL FIELD

The present invention relates to a colored plastic package. More particularly, it relates to a plastic package which maintains coloration when used as a package but can easily be decolored by external stimulation during reproduction.

BACKGROUND ART

Plastics are suitable for mass production because of easy molding. Moreover, since the plastics possess excellent physical properties such as transparency and impact resistance, they have been widely used as various kinds of packages such as bottle containers, cups, pouches, and packaging sheets.

These packages are packed with various kinds of drinks, seasonings, cosmetics, drugs and the like as contents. However, some of these contents change in quality or deteriorate by a light, and therefore, for the purpose of protecting such contents from the light, the packages are colored in some cases. Furthermore, in order to differentiate commercial products from other similar products by giving the beauties with decorating the packages, the packages is sometimes colored as a part of the decoration of the packages.

In general, the plastic packages are colored by mixing colorant such as pigment or dye into plastic which is main material of the packages. When the coloring agent is mixed; the packages absorb a light having specific wavelength to cause color appearance.

The wavelength of the light absorbed by a substance depends on a chemical structure of the substance, and therefore, in order to obtain a specific color, it is necessary to use a specific chemical substance.

Typical examples of the packages which are colored by mixing the colorant are as follows.

Plastic containers colored green, blue, brown and the like by mixing various pigments or dyes into resins are examples thereof. With these containers, penetration of the wavelength components of the light which is absorbed by coloring components into the containers is restricted, and in consequence, the protection of the contents that are apt to change in quality or to deteriorate owing to a light beam, i.e., visible light barrier performance, is imparted. In addition, the containers colored with a specific color can create a product image and can be differentiated from other products, so that it is possible to enhance buying desire of consumers for the own products.

In recent years, however, from the viewpoints of the saturation of landfill sites and resource saving, the recycle of resins has been promoted, but it is difficult to reuse the colored packages. In particular, PET bottles (bottles formed using PET (polyethylene terephthalate) as a fundamental resin) are required to be colorless at a time when they are treated as recycled materials.

Therefore, in the case of the PET bottles colored with colorant constituted of conventional chemical substances, it is difficult to decolor them, which makes their recycle severe. Although this problem is common to the whole plastic packages, it is particularly serious for the PET bottle because of its amount of usage.

As a measure therefor, packages have been decorated by covering the packages with colored labels and, during the reproduction, the packages themselves are separated from the labels and then processed.

This method satisfies recycle properties of the packages themselves, but it is necessary to peel and separate the labels from the packages after their use.

On the other hand, there are cases where coloration is made by not a chemical coloring mechanism but a physical coloring mechanism in which reflection or interference of the light is utilized.

For example, Japanese Patent Laid-Open No. 80928/1996 proposes a package which develops a chromatic color by providing, on an outer layer of a thermoplastic resin layer, a layer containing a scaly thin film having a high refractive index so that the scaly thin film may be oriented in a plane direction of the surface of the package.

In the package, however, a large amount of a mica/titanium pigment or the like is used as the scaly thin film, and hence, separation of the material is necessary during the recycle, which still makes their recycle severe. Therefore, the above method of the coloration by the physical coloring mechanism is not allowed in a flow of the present recycle, as in the case of the above method by the chemical coloring mechanism.

As another example, Japanese Patent Laid-Open No. 250741/1998 (pages 1 to 4, FIGS. 1 to 10) proposes a transparent container in which a laminate film of a predetermined shape having a thin-film interference function is arranged along the inside of a main body of the transparent container.

However, since the transparent container must involve the laminate film therein, this technology is limited to bottles having a mouth part of an inside diameter smaller than that of the body part. Therefore, it is impossible to apply the technology to cups, trays, and the like molded from plastics. In addition, since the laminate film is in contact with contents, there arises a hygienic problem in a case where the contents are foods.

As described above, in the present packages employing the chemical coloring mechanism, the pigments or dyes blended in the packages cannot be removed in the process of the recycle.

Therefore, there is a problem that the packages once colored cannot be remanufactured in the form of the transparent packages.

A flow from the manufacture to the recycle of the packages, e.g., the PET bottles can be mainly classified into a manufacture process, a distribution process, and a collection/remanufacture process, as shown in FIG. 10.

Namely, the PET bottles manufactured by blow molding injection-molded preforms to stretch and orientate them are filled with contents, sold (consumed), and then collected. The collected PET bottles are separated from colored bottles, crushed, washed to separate impurities therefrom, and then reproduced in the form of flakes or pellets.

In such a flow of the manufacture and the recycle, the injection molding and blow molding are conducted in the manufacture process, and melt extrusion is conducted in a re-pelletization step in a collection/remanufacture process. In these steps, stimulations of a high temperature, a high pressure and the like are applied to the material.

However, even when passed through the steps in which such stimulations are applied, the pigments or dyes still remain without the disappearance of colors because of their high coloration stability. Namely, the pigments or dyes permanently maintain the coloration once they are mixed with the PET.

Therefore, there arises a problem that the colored PET bottles cannot be used as starting materials for the PET bottles to be re-manufactured.

In view of such present situations, in Japan and in a field of manufacture/recycle of the PET bottles, the manufacture and distribution of the PET bottles which cannot be reused are restrained. In other words, the coloration of the PET bottles is prohibited in principle from the viewpoints of the improvement of a reuse ratio of the PET bottles and the promotion of the recycle.

In Japan, it is mentioned as one item of material evaluation standards which are self-organized standards that the PET bottles should be colorless and transparent.

The material evaluation standards are guideposts established to evaluate whether or not the PET bottles once manufactured are suitable for the reuse and remanufacture, and they are self-organized agreements in the field of the manufacture/recycle of the PET bottles.

FIG. 11 shows a flow of a reuse suitability test (reuse suitability evaluation) of the PET bottles performed in accordance with the material evaluation standards.

As shown in the drawing, the reuse suitability evaluation is performed for each of reproduced flakes obtained by crushing trial bottles to be evaluated, reproduced pellets obtained by melt molding the reproduced flakes, injection molded plates obtained by injection molding the reproduced pellets, and fibers, bottles and sheets obtained by molding the reproduced pellets.

As evaluation items, there are mentioned "appearance, crush suitability" for the reproduced flakes, "IV, color tone, dry suitability" for the reproduced pellets, "appearance, haze, thermal properties" for the injection molded plates, and "moldability, mechanical properties, color tone, haze, etc." for the fibers, the bottles and the sheets.

Particularly, among these evaluation items, "the color tone" is the evaluation item which is investigated in a wide range including the reproduced pellets, fibers, bottles and sheets.

If the trial bottles are contaminated with a pigment or a dye, they remain colored with the pigment or the like even at a stage where they are molded into the reproduced pellets, and hence, they do not satisfy the evaluation standards of "the color tone". In addition, the color of the trial bottles still remains even at a stage where they are molded into the fibers, the bottles or the sheets, and therefore, the evaluation standards of "the color tone" are not satisfied herein, either.

As described above, the PET bottles mixed with the pigment or the dye do not satisfy the material evaluation standards, and for this reason, they cannot be used as starting materials for the reproduction. Therefore, the coloring of the PET bottles is voluntarily restrained in makers of the PET bottles.

As understood from the above, it is essential from the viewpoint of recycle promotion to evaluate the suitability of the PET bottles to be reused in accordance with the reuse suitability evaluation based on the material evaluation standards. On the other hand, it is also necessary that "the color tone" is evaluated in the suitability test to reject the colored PET bottles.

As mentioned above, however, the coloring of the containers molded as the PET bottles for the purpose of providing functions such as a visible light barrier and a decoration has been desirable from various viewpoints of preventing the change in quality and deterioration of contents therein, promoting the commercialization of new products, differentiating them from other products, promoting the sales of own products, and the like.

In view of such situations, in the field of the manufacture/recycle of the PET bottles, it has been required to propose a technology of providing consumers with the PET bottles which conform to the evaluation items of the reuse suitability evaluation and simultaneously have functions such as the visible light barrier and the decoration. In other words, there has been desired a technology which is capable of providing the colored PET bottles in a distribution process and simultaneously capable of decoloring the PET bottles in a collection/remanufacture process.

The present invention has been developed in consideration of the above circumstances, and an object of the present invention is to provide a plastic package and a method for its reproduction which permits possessing functions such as the visible light barrier and the decoration in the distribution process, satisfying the evaluation standards of the reuse suitability evaluation in the collection/remanufacture process, and improving of a reuse ratio of the packages s to promote the recycle of them.

DISCLOSURE OF THE INVENTION

In order to achieve the object, the present inventors have found that a package containing a thin-film layered structure comprising substances having different refractive indices and colored by an interference effect due to the thin-film layered structure or a plastic package which develops color by forming a fine periodically arranged structure which is different in optical characteristics on the surface of the package can be easily decolored by heating in a reproduction step and is excellent in recycle properties. Thus, they have accomplished the present invention.

Incidentally, the "plastic package" herein means a package wherein most of the parts constituting the package are formed out of plastics, and encompasses the package containing a small amount of inorganic matter. Moreover, it also encompasses the meanings of a multilayer packaging structure and a packaging structure.

Furthermore, the "coloration" and "decoration" have meanings including coloration of a plastic package with a chromatic color, blockade of a light having a specific wavelength region so that the light does not pass through the plastic package into the inside.

In a plastic package (multilayer packaging structure) of the first invention, the body part of the container contains a thin-film layered structure comprising substances having different refractive indices and is colored by an interference effect due to the thin-film layered structure.

When the plastic package is made as above, since it is colored by an interference effect due to the thin-film layered structure, the plastic package can possesses the functions of a visible light barrier and decoration. Also, when the plastic package is melted, the regular configuration of a physical coloring mechanism is destroyed, whereby the attached color can be decolored.

Specifically, in the case that the plastic package of the present invention is molded into PET bottles, for example, the PET bottles are processed as follows in a flow of manufacture and recycle (FIG. 10).

Since the PET bottles manufactured in the manufacture process is colored by an interference effect due to the thin-film layered structure, they can sufficiently and surely exhibit the functions of the visible light barrier and decoration in the distribution process which only requires such functions.

In the collection/remanufacture process, since the thin-film layered structure is broken and the regular configuration is destroyed by melting or the like, the PET bottles are decolored. Therefore, even when the reuse suitability evaluation is conducted on remanufactured products obtained through the collection/remanufacture process, the standard of "color tone" can be satisfied.

Thus, the plastic package of the present invention can possess the functions of the visible light barrier, decoration, and the like in the market and also satisfy the evaluation standard even in the reuse suitability evaluation of PET bottles.

Accordingly, since the plastic package can be remanufactured, the reuse ratio can be enhanced and hence recycle thereof can be promoted.

In addition, in the case of the plastic package of the present invention, the plastic package itself develop color, cups, trays, and the like can be objects thereof without limiting to bottles. Therefore, the use range can be broadened as compared with the fact that the transparent container described in Japanese Patent Laid-Open No. 250741/1998 is applied only to bottles.

Furthermore, when the thin-film layered structure is laminated on the outer surface of container, there arises no hygienic problem even in the case that the contents are foods.

In this connection, containers having a thin-film layer are hitherto present, but the thin-film layer is vapor-deposited for enhancing a barrier ability and coated for the purpose of scratch prevention. Thus, there are no cases that coloration is aimed at.

Moreover, there exist those in a form of a highly homogeneous molded article (film, thread, or the like), which contain a thin-film layered structure (e.g., composite fibers described in Japanese Patent Laid-Open No. 181630/1999, etc.), but no containers having a thin-film layered structure are present.

Furthermore, according to the other embodiment of the first invention, the package has another resin layer in addition to the above thin-film layered structure and one or more resins in the above thin-film layered structure is the same kind as the one or more resins in the above other resin layer(s).

When the plastic package is made as above, since one or more resins in the above thin-film layered structure is the same kind as the one or more resins in the above other resin layer, the recycle properties of the plastic package can be enhanced.

Moreover, according to the other embodiment of the first invention, in the package, the above other resin layer comprises a base resin layer.

When the plastic package is made as above, since one or more resins in the base resin layer as the other resin layer is the same kind as the one or more resins in the thin-film layered structure, the recycle properties of the plastic package can be enhanced.

Furthermore, according to the other embodiment of the first invention, the package itself is a rigid container made of a resin.

When the plastic package is made as above, the rigid container made of a resin can be colored by an interference effect due to the thin-film layered structure. Therefore, the functions of the visible light barrier and decoration can be imparted to the rigid container. When the plastic package is melted at a temperature equal to or higher than a determined temperature, the regular configuration of a physical coloring mechanism is destroyed, whereby the attached color can be decolored. Thus, the rigid container can be remanufactured and the reuse ratio can be improved, so that recycle can be promoted.

In a plastic package which is the second invention, wherein, on at least a part of the surface of the package, portions different in optical characteristics from the above surface are periodically arranged. As such a plastic package, there may be, for example, mentioned a plastic package wherein the above plastic package includes a crystalline resin as a main material and the above portion different in the optical characteristics is a crystal structure which is different from the crystal structure of the above surface and a plastic package wherein the portions different in optical characteristics are voids formed on the surface of the plastic package.

A method for decorating a plastic package which is the third invention is a method for decorating a plastic package wherein the decoration is conducted on the surface thereof by periodically arranging, on at least a part of the surface of the plastic package, portions which are different in the optical characteristics from the above surface. As various embodiments of such a decoration method, for example, there may be mentioned a decoration method wherein the plastic package includes a crystalline resin as a main material and portions having the different optical characteristics are formed by providing spherite crystalline sites on the surface; a decoration method wherein the spherite crystalline sites are formed by utilizing a diffraction or interference phenomenon of a light; a decoration method according to the above embodiments wherein at least a part of the surface of the plastic package made of a plastic material being transparent in a wavelength region and being semitransparent or opaque in another wavelength region is irradiated with a light of a wavelength included in the wavelength region of semitransparency or opacity to form the portions different in optical characteristics in the wavelength region of transparency; a decoration method wherein the above spherite crystalline sites are formed on the surface by previously forming concavities and convexities for converging a light on the above surface, and irradiating the concavities and convexities with the light; and a decoration method wherein the portions having the different optical characteristics are formed by mixing light/heat-absorbing fine particles with the above plastic package to disperse the fine particles therein, locally irradiating the package with a laser light to heat the light/heat-absorbing fine particles, and thereby vaporizing a resin surrounding the light/heat-absorbing fine particles to form voids.

A method for reproducing a plastic package which is the fourth invention is a method for reproduction comprising collecting the above plastic package and melting it to effect reproduction, wherein the above melting for the reproduction is conducted at a temperature equal to or higher than the temperature at which the color of the plastic package disappears.

When the method of reproduction of the plastic package is made as above, the collected plastic package is melted at a temperature equal to or higher than a determined temperature (the temperature at which the color of the plastic package disappears), whereby the regular configuration can be destroyed to effect decoloring. Thereby, the plastic package can satisfy the reuse suitability evaluation in the collection/remanufacture process.

Accordingly, the plastic package can exhibit the functions of the visible light barrier and decoration at a time when contents are filled therein and the resulting product is provided for consumers and the plastic package is decolored and thus becomes recyclable in the collection/remanufacture process. Therefore, the reuse ratio of the containers and the like molded with the plastic package is enhanced and hence recycle can be promoted.

According to the present invention, the plastic package contains a thin-film layered structure constituted of substances having different refractive indices and hence the plastic package can be colored by an interference effect due to the thin-film layered structure.

Moreover, the plastic package can be colored by periodically arranging, on at least a part of the surface of the plastic package, portions which are different in the optical characteristics from the above surface.

Therefore, the plastic package can be colored by injection molding in the manufacture process in the flow of manufacture/recycle and the plastic package can be decolored by melt-extrusion in the collection/remanufacture process.

In consequence, the functions of the visible light barrier and decoration owing to coloration of the package can be exhibited in the distribution process and recycle is enabled by decoloring in the collection/remanufacture process.

Accordingly, the reuse ratio of the containers (e.g., PET bottles, etc.) molded with the plastic package can be enhanced and hence recycle can be promoted.

BRIEF DESCRIPTION OF THE DRAWINGS

FIG. 3 is a drawing for illustrating a chemical coloring mechanism and a physical coloring mechanism;

FIG. 9 is a drawing for illustrating a third embodiment of the decoration method of the present invention and FIG. 9(a) is an illustration of spot irradiation with a laser light and FIG. 9(b) is an illustration of irradiation with a laser light utilizing an interference fringe pattern.

BEST MODE FOR CARRYING OUT THE INVENTION

The following will explain the present invention in detail.
[First Invention: Plastic Package]

In a plastic package of the present invention, a container body has a thin-film layered structure constituted of substances having different refractive indices and is colored by an interference effect due to this thin-film layered structure.

Figure 1:
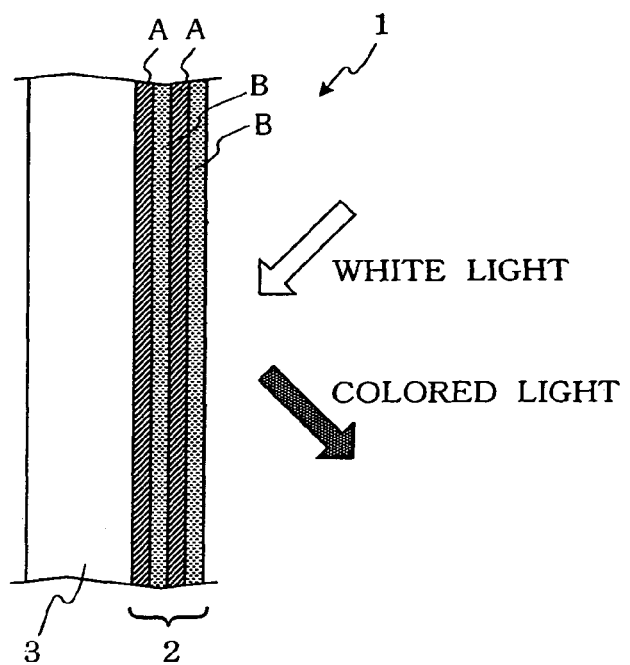
FIG. 1 is a block diagram showing a constitution of a plastic package of the present invention.

For example, as shown in FIG. 1, in the case that a thin-film layered structure 2 is constituted of a plurality of layers, it has an alternate laminate layer structure of two layers A and B having different refractive indices. In consequence, a plastic package 1 itself is colored by a physical coloring mechanism. At this time, the thickness of each of the two layers A and B is so thin as 1 μm or less. Moreover, as a difference between the refractive indices of the two layers A and B is larger, as the number of repeatedly laminated layers is larger, and as the control of the layer thickness is more homogeneously carried out, a higher coloring efficiency can be obtained. In general, in the case that such a thin-film layered structure is constituted of polymers alone, the difference between the refractive indices is limited. Accordingly, increasing the number of the repeated layers enables the efficient coloring.

Figure 2:
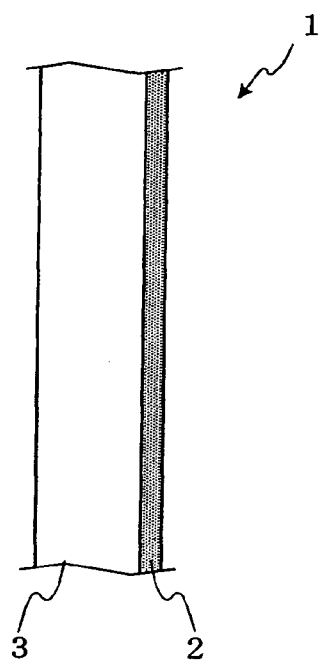
FIG. 2 is a block diagram showing another constitution of a plastic package of the present invention.

Furthermore, as shown in FIG. 2, even in the case that the thin-film layered structure 2 is constituted of one layer, the package is colored by the physical coloring mechanism when the plastic package 1 having the thin-film layered structure 2 further contains another resin layer 3, because the layer constituting the thin-film layered structure 2 and the other resin layer 3 have different refractive indices, respectively.

The coloring principle is classified into two kinds of chemical coloring and physical coloring.

As to the chemical coloring, when a white light including lights having a plurality of wavelengths enters a material, coloring occurs owing to absorption of a light in a wavelength range showing a specific color by the material.

Figure 3A:
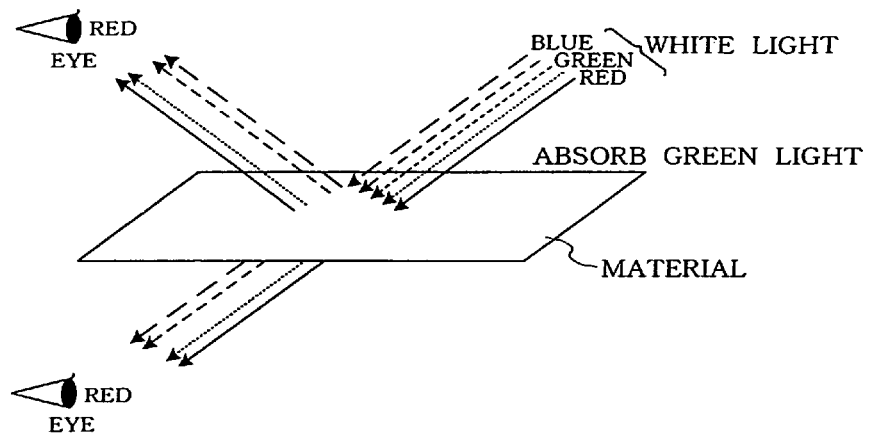
FIG. 3(a) showing the chemical coloring mechanism.

For example, as shown in FIG. 3(a), when the material absorbs a light in a wavelength range showing green color, lights of a reflected light and a transmitted light which enter eyes are observed as a red color which is a complimentary color of the green color in both cases of the lights.

According to the principle of the chemical coloring, coloring occurs owing to absorption of a light having a specific wavelength (a light having a selected wavelength) by a substance with state energy transition of a chemical species.

The wavelength of the light absorbed by the substance depends on a chemical structure of the substrate. Therefore, for the appearance of a specific color, a specific chemical substance is required to be used. Examples of the specific chemical substance include a pigment and a dye.

On the other hand, as to the physical coloring, when the white light enters the material, the coloring occurs owing to diffraction, interaction, scattering or the like of a light in a wavelength range showing a specific color on the material.

Figure 3B:
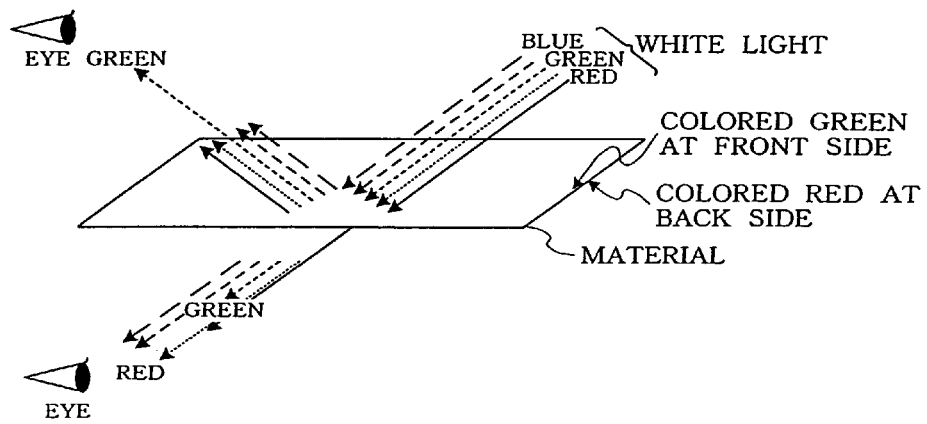
FIG. 3(b) showing the physical coloring mechanism.

For example, as shown in FIG. 3(b), when the material strongly reflects a light in a wavelength range showing green color, the light which enters eyes as a reflected light is observed as a green color. On the contrary, a transmitted light is observed as a red color which is a complimentary color of green color.

The coloring by this physical coloring mechanism is different from the case of the chemical coloring mechanism, and the light is not emitted based on properties inherent to the material but the coloring is achieved owing to formation of a certain configuration on an incident plane of the light. Namely, the coloring occurs owing to the reflection of the light having a specific wavelength (a light having a selected wavelength) by diffraction or interference due to a regular configuration or a difference between refractive indices which the material has.

As characteristics of this physical coloring mechanism, the coloring occurs so long as there is the regular configuration formation even in the general-purpose material only, in contrast to the chemical coloring mechanism; decoloring is easily possible by the destruction of the regular configuration; and this mechanism is effective under a recycle regulation where usable materials tend to be limited.

Of these characteristics, a particularly important feature to accomplish the present invention is that the decoloring can be easily made by the destruction of the regular configuration.

The plastic package is colored according to the physical coloring mechanism by an interference effect due to the thin-film layered structure constituted of substances having different refractive indices. Thereafter, when the plastic package is heated, the regular configuration is destroyed and, at that time, decoloring occurs.

When this feature is utilized in a flow of manufacture/recycle of PET bottles, the following progress will be made.

In the manufacture process, when a thin-film layered structure is laminated on a base resin layer (e.g., PET layer), a PET bottle of a plastic package constituted of the base resin layer and the thin-film layered structure is colored according to the physical coloring mechanism. Then, in the collection/remanufacture process, when the PET bottle is melted under heating, the regular configuration is destroyed to result in decoloring.

Therefore, in the distribution process in the flow of manufacture/recycle of PET bottles, PET bottles having the functions of the visible light barrier and decoration realized by coloring can be provided for the market. Furthermore, in the collection/remanufacture process, since they can be decolored by heating or the like means, the evaluation standard of "color tone" can be satisfied in the reuse suitability evaluation.

Accordingly, it becomes possible to remanufacture PET bottles colored in the manufacture process and hence recycle thereof can be promoted.

As the substances constituting the thin-film layered structure 2 in FIG. 1, the following substances may be used in combination. For example, a thermoplastic polyester can be used. As the thermoplastic polyester, there can be used an aliphatic, an alicyclic or an aromatic polyester which is derived from a dicarboxylic component and a diol component, or a copolymer or a blend thereof. Examples of the dicarboxylic component include aromatic dicarboxylic acids such as terephthalic acid, isophthalic acid and naphthalenedicarboxylic acid; aliphatic carboxylic acids such as succinic acid, adipic acid and sebacic acid; and alicyclic dicarboxylic acids such as cyclohexanedicarboxylic acid. Examples of the diol component include aliphatic glycols such as ethylene glycol, diethylene glycol and butanediol; alicyclic glycols such as cyclohexanedimethanol (CHDM); and aromatic diols such as bisphenols. Furthermore, polybasic carboxylic acid components and polyhydric alcohol components having a trivalent or a higher valent functional group can also be used.

Suitably usable typical examples include polyethylene terephthalate (PET), polybutylene terephthalate (PBT), polyethylene naphthalate (PEN), polycarbonates, polyarylates, isophthalic acid-copolymerized PET (PET-I), cyclohexanedimethanol (CHDM)-copolymerized PET, and polyesters copolymerized with a soft segment constituting a polyolefin or a polyether.

Moreover, a thermoplastic polyamide can be used. As the thermoplastic polyamide, there can be used an aliphatic, an alicyclic or an aromatic polyamide derived from a dicarboxylic component and a diamine component; a polyamide derived from an aminocarboxylic acid or a lactam thereof; or a copolymer or a blend thereof. Examples of the dicarboxylic component include aliphatic dicarboxylic acids such as succinic acid, adipic acid, sebacic acid and decanedicarboxylic acid; and aromatic dicarboxylic acids such as terephthalic acid and isophthalic acid. Examples of the diamine component include linear or branched aliphatic diamines such as 1,6-diaminehexane, 1,8-diaminoocatane and 1,10-diaminodecane; alicyclic diamines such as bis(aminomethyl)cyclohexane and bis(4-aminocyclohexyl)methane; and aromatic diamines such as m-xylylenediamine and p-xylylenediamine. Furthermore, examples of the aminocarboxylic acid include aliphatic aminocarboxylic acids such as ω-aminocaproic acid, ω-aminooctanoic acid and ω-aminoundecanoic acid; and aromatic aliphatic aminocarboxylic acids such as p-aminomethylbenzoic acid an p-aminophenylacetic acid.

More specifically, 6-nylon, 6,6-nylon, 11-nylon, 12-nylon, 6,10-nylon, 6,12-nylon, MXD6 (m-xylyleneadipamide) nylon and the like are suitably used.

Furthermore, an olefin resin can also be used. Examples of the olefin resin include polyethylenes (PE) such as low-density polyethylene (LDPE), medium-density polyethylene (MDPE), high-density polyethylene (HDPE), linear low-density polyethylene (LLDPE) and linear very low-density polyethylene (LVLDPE); polypropylene (PP), ethylene-propylene copolymers, polybutene-1, ethylene-butene-1 copolymers, propylene-butene-1 copolymers, ethylene-propylene-butene-1 copolymers, ethylene-vinyl acetate copolymers, ionically crosslinked olefin copolymers (ionomers), and blends thereof. In addition thereto, there can be used polyacrylonitrile, polystyrene, polymethylpentene, polyvinyl alcohol, polymethyl methacrylate, cyclic olefinic copolymers (COC), and fluorinated polymers.

Since these substances have different refractive indices, respectively, they are combined to form a regular configuration, thereby developing a color.

One or more resins in the thin-film layered structure 2 are preferably the same kind of resins as one or more of resins in the other resin layer 3. Thereby, the recycle properties of the plastic package 1 can be enhanced.

Moreover, in particular, in the case that the container of the plastic package 1 is a PET bottle, one or more substances of the substances constituting the thin-film layered structure 2 are preferably polyester resins. In this case, since the other resin layer 3 is also PET, i.e., a polyester resin, the recycle properties of the PET bottle can be enhanced.

Furthermore, when a functional resin (barrier material or the like) is selected as a resin to be incorporated in the thin-film layered structure 2, coloration and functionality impartment can be conducted simultaneously.

As the substance constituting the other resin layer 3, there may be, for example, mentioned the aforementioned polyesters, polyamides, polyolefin resins, and the like.

The other resin layer 3 may be a base resin layer for maintaining the shape of a container formed by the plastic package 1.

Specifically, for example, a PET layer of PET bottles and a polyethylene layer, a polypropylene layer, or the like of food containers correspond to the base resin layer.

Moreover, the container formed by the plastic package 1 may be a rigid container made of a resin.

The rigid container includes, for example, bottles, cups, trays, and the like. Also, the rigid container includes a preform which is an intermediate product.

When the container formed by the plastic package 1 is a rigid container made of a resin, it becomes possible to remanufacture the rigid container and thus recycle can be promoted.

Figure 4:
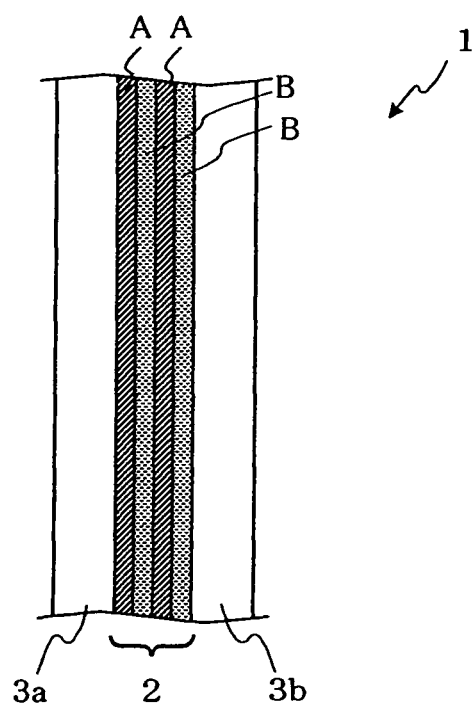
FIG. 4 is a block diagram showing further other constitution of a plastic package of the present invention.

In this connection, in FIG. 1 and FIG. 2, the other resin layer 3 constituting the plastic package 1 is one layer, but it is not limited to one layer and may be two or more layers as shown in FIG. 4.

Moreover, in FIG. 1, the thin-film layered structure 2 is constituted of four layers but is not limited to four layers and may be three or less layers or five or more layers.

As molding methods of the plastic package, the following methods may be mentioned.

For example, there may be mentioned co-extrusion molding represented by co-injection, over-co-injection, die-slide-injection, and the like.

In addition, there may be mentioned a method of winding a multilayer non-stretched film at preform formation and subsequently subjecting it to stretch blowing.

Furthermore, there may be mentioned a method of conducting multilayer coating (alternate dipping) at preform formation and subsequently subjecting it to stretch blowing.

Moreover, there may be mentioned a method of attaching a multilayer film on the surface of containers and a method of forming the thin-film layered structure by vapor deposition or coating such as spraying on molded containers.

[Second Invention: Plastic Package]

A plastic package of the present invention is decorated by applying a physical coloring mechanism. Namely, by periodically arranging portions different in optical characteristics on the plastic package, a light interferes and is diffracted to cause color appearance.

The periodical arrangement of the portions having the different optical characteristics (formation of a periodically arranged structure) means to arrange the portions while regularly/periodically changing the optical characteristics, e.g., refractive index, reflection, transmittance, absorbance, polarization degree and the like.

For example, it may include formation of spots or lines which are different in refractive index from the surroundings on at least a part of the surface of the plastic package at regular intervals or formation of spots or lines which are different in absorbance from the surroundings on at least a part of the surface of the plastic package at regular intervals.

The periodical configuration is preferably formed in a three-dimensional manner, i.e., in the directions of the surface and surface thickness of the package but decoration can be sufficiently conducted by two-dimensional formation (the surface of the package).

The "surface of the plastic package" herein encompasses not only the front side forming the package but also any surfaces formed inside the surface, for example, a surface formed by an inner layer and interface of layers in a multilayer container.

The arranging period of the optical characteristics is determined by a color to be colored or a wavelength of a light to be shielded. For example, in the case that a light ranging from ultraviolet region to infrared region is shielded, a proper range is from 0.1 µm to 5 µm. Moreover, by forming an arranged period acting on a light in a wavelength range of 0.4 µm to 0.7 µm which is a visible light region, any color can be developed.

In this case, the periodicity is not necessarily perfect but there may be partly present defects such as disappearance or unevenness of periodicity and discontinuation of the periodical configuration as long as the periodicity is maintained as a whole.

Moreover, with regard to the arranging period of the optical characteristics, the whole decorated part of the plastic package may be not the same pattern but a different pattern. By changing the pattern of the arranging period, a design with a plurality of colors can be formed.

The number of the repeated periods necessary for obtaining color appearance by the periodical configuration is 10 periods or more, preferably 50 periods or more, particularly preferably 100 periods or more.

Subsequently, with regard to the method of forming a periodically arranged structure different in the optical characteristics on the plastic package, an example of applying the method to plastic bottle containers is described.

The plastic bottle containers can be molded by usual molding means of bottle containers. For example, the containers can be obtained by subjecting a preform to stretch blow molding.

Specifically, a mouth part of a bottom-having cylindrical preform manufactured by a suitable means such as injection molding, compression molding, multilayer injection molding, or multilayer compression molding is first thermally crystallized (spherulite formation) by a suitable means to impart heat resistance.

Next, the preform is heated to a stretching temperature equal to or higher than the glass transition point (Tg) and is stretched in a longitudinal direction (axial direction) with a stretching rod or the like and in a transverse direction (circumferential direction) with blowing air in a mold heated at a predetermined heat-set temperature.

The aforementioned blow mold was heated and, at biaxial stretch blow molding, the outside of the wall of a blow molded article was brought into contact with the inner surface of the mold for a predetermined time to conduct heat-set. Then, after a predetermined time of heat-set, the blowing fluid is changed to a fluid for inside cooling to cool the inside of the blow molded article.

The bottle containers molded by the stretch blow molding is stretched in a blow direction and thus orientation crystallization is achieved.

The blow molded articles taken out of the mold is cooled by standing or by blowing a cold air.

As the plastic materials forming the plastic bottle containers, for example, preferred are thermoplastic polyesters such as polyethylene terephthalate (PET), polyethylene isophthalate, polybutylene terephthalate, polyethylene naphthalate, polycarbonates, polyarylates, or copolymers of monomers forming the above resins, copolymers of cyclohexanedimethanol with monomers forming the above resins, polyethylene (PE), polypropylene (PP), polystyrene, cyclic olefinic copolymers, ethylene-vinyl alcohol copolymers, Nylon resins, vinyl chloride resins, adhesive resins, or blends of these resins or with other resins. Particularly, ethylene terephthalate-based thermoplastic polyesters such as polyethylene terephthalate are preferred.

The above plastic materials may be used as materials for forming monolayer plastic bottle containers or may be used in combination as materials for forming any parts such as inner and outer layers, an intermediate layer, and an adhesive layer, which constitute multilayer plastic bottle containers.

[Third Invention: Method for Decorating a Plastic Package]

The following will describe a decoration method by forming a periodically arranged structure different in optical characteristics on a plastic package.

The present invention is not limited to these embodiments.

First Embodiment

Figure 5:
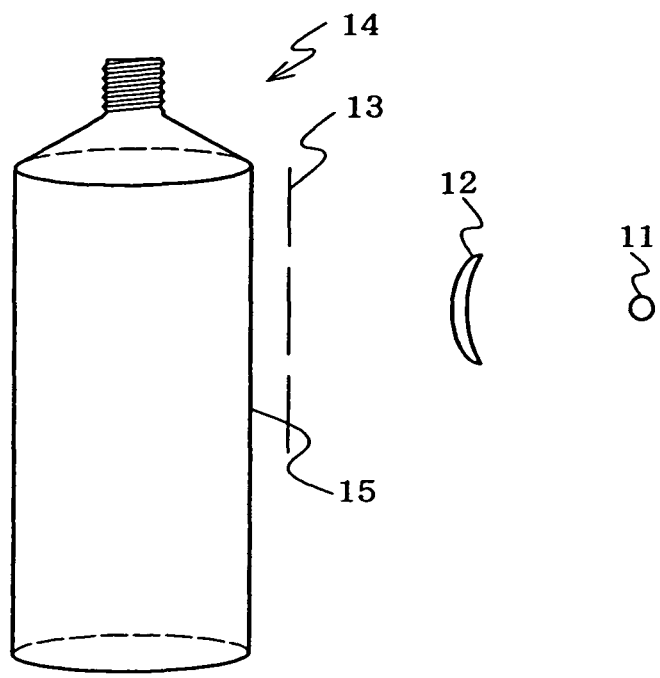
FIG. 5 is a drawing for illustrating a first embodiment of the decoration method of the present invention.
Figure 6:
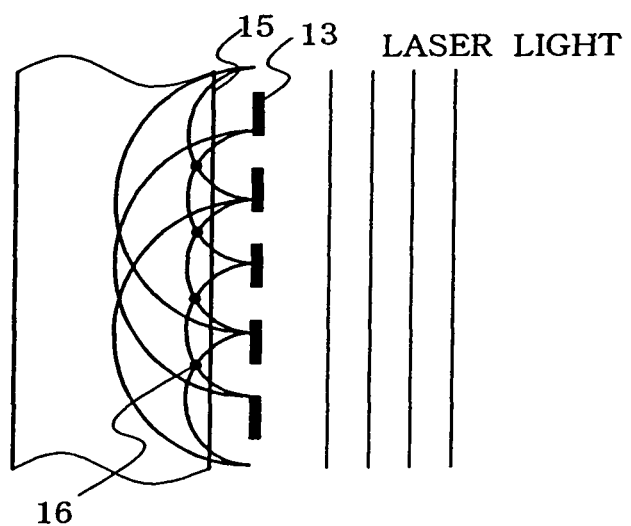
FIG. 6 is an enlarged view in the vicinity of a diffraction grating and a drawing showing an appearance of interference fringes.
Figure 7:
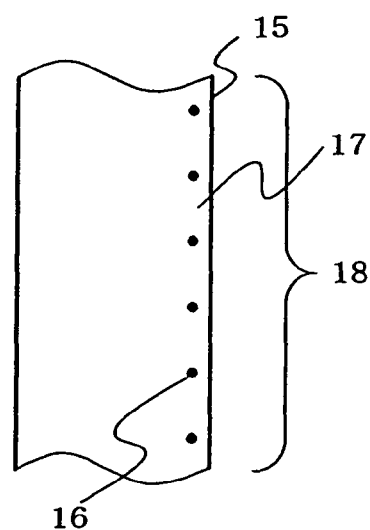
FIG. 7 is a drawing showing a periodically arranged structure formed on the wall of a plastic bottle container.

FIGS. 5 to 7 are drawings for illustrating a first embodiment of the method for forming a periodically arranged structure different in optical characteristics.

In the present embodiment, a periodically arranged structure is formed on a plastic bottle container utilizing a diffraction phenomenon of a laser light.

In this method, a laser source 11, a lens 12, and a diffraction grating 13 are used.

The laser source 11 oscillates a laser light and, for example, carbon dioxide gas laser, YAG laser, semiconductor laser, helium-neon or argon gas laser, excimer laser, and the like can be used. In addition, those whose wavelengths are converted into these laser lights can be also used.

The laser light may be used in a continuous oscillation state or in a pulse oscillation state.

The lens 12 is used for converting the laser light oscillated from the laser source 11 into a parallel ray.

The diffraction grating 13 diffracts the laser light. For example, a mesh having a grating interval of 0.1 µm to 2000 µm can be used.

A plastic bottle container 14 to be decorated is placed at a side part of the diffraction grating.

The laser light oscillated from the laser source 11 is converted into a parallel ray by the lens 12.

The parallel laser light forms a periodical pattern derived from interference fringes, i.e., intensity distribution of the laser light by the passage of the diffraction grating 13.

FIG. 6 is an enlarged view in the vicinity of diffraction grating and is a drawing showing an appearance of interference fringes.

Thus, the laser light passing through the diffraction grating 13 is diffracted and interferes to form a periodical pattern (a pattern having a definite regularity).

When a wall surface 15 of the plastic bottle container is irradiated with the laser light which has formed such a periodical pattern, a part of the container wall 15 is locally heated by a part 16 having a strong laser light intensity. For example, the thickness of the wall 15 is about 100 μm in a PET bottle mainly made of polyethylene terephthalate and a site of a depth of 1 to 5 μm in the vicinity of the surface layer across the thickness is heated.

When the heated site reaches a determined temperature or higher, only the site is melted to relieve a structure constituted of an amorphous part and an oriented crystalline portion formed in the container wall 15 and, in a subsequent cooling process, spherulite is formed. The temperature varies depending on the resin used but it is about 190° C. in the case of polyethylene terephthalate, for example.

According to this method, as shown in FIG. 7, fine spherite crystalline sites 16 are periodically formed on the container wall 15. In this case, an oriented crystalline portion 17 and spherite crystalline sites 16 are different in refractive index from each other. Therefore, there can be obtained a structure 18 in which the spherite crystalline sites 16 different from the oriented crystalline portion 17 in the optical characteristics (refractive index) are periodically arranged.

Second Embodiment

Figure 8:
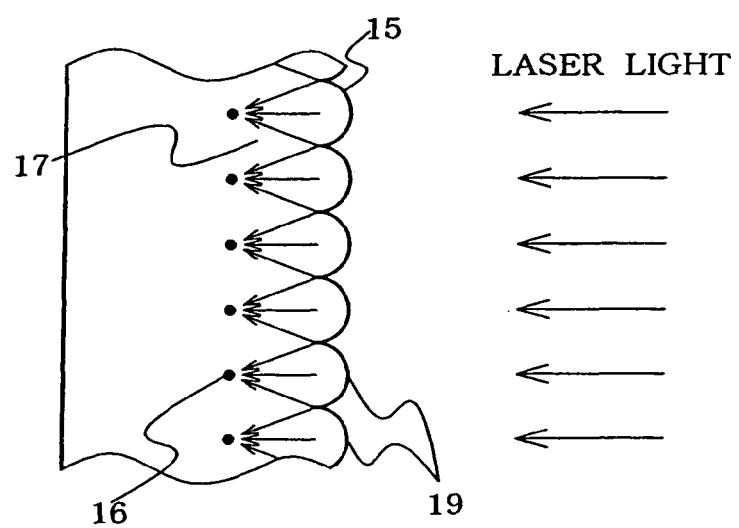
FIG. 8 is a drawing for illustrating a second embodiment of the decoration method of the present invention.

FIG. 8 is a drawing for illustrating a second embodiment of the method for forming a periodically arranged structure different in optical characteristics.

In the present embodiment, a periodically arranged structure is formed on a plastic bottle container utilizing refraction and convergence of a laser light.

In the present embodiment, fine concavities and convexities 19 having a lens effect are formed on a wall 15 of a plastic bottle container 14.

The concavities and convexities 19 can be formed, for example, by forming concavities on the surface of a blow mold, and transferring the shape from the mold to the container wall during a thermal treatment in the molding step of the above plastic bottle container.

When the concavities and convexities 19 formed on the wall 15 of the plastic bottle container are irradiated with a laser light as in the first embodiment, as shown in FIG. 8, the laser light is refracted by a lens effect of the concavities and convexities 19 to converge on a certain site in the thickness direction apart from the top part of a convex part. Since intensity of the laser light is increased at the site on which the laser light converges, the site is heated by energy of the laser light.

When the heated site reaches a determined temperature or higher, only the site is melted to relieve a structure constituted of an amorphous part and an oriented crystalline portion formed in the container wall 15 and, in a subsequent cooling process, the spherite crystalline sites 16 are formed.

Therefore, by periodically forming the concavities and convexities 19 on the wall 15 of the plastic bottle container, the spherite crystalline sites can be formed periodically. As mentioned above, since the oriented crystalline portion 17 and the spherite crystalline sites 16 are different in refractive index from each other, a periodically arranged structure 18 different in optical characteristics (refractive index) can be formed.

In the present embodiment, the periodical concavities and convexities are formed on the wall of the plastic bottle container, and in the oriented crystalline portion, the spherite crystalline sites which are different in optical characteristics (refractive index) from the oriented crystalline portion are periodically arranged. In consequence, it is possible to obtain such an iridescent gloss as seen in a hologram.

Third Embodiment

FIG. 9 is a drawing for illustrating a third embodiment of the method of forming a periodically arranged structure different in optical characteristics.

In the present embodiment, light/heat-absorbing fine particles 20 which are to be nuclei of heat generation are mixed and dispersed into a main material resin of a plastic bottle container 14, and then molding of the container is achieved.

The light/heat-absorbing fine particles are fine particles which react with a specific laser light to generate heat. For example, there may be mentioned mica, kaolin, talc, titanium oxide-coated mica, and the like.

The particle size of the light/heat-absorbing fine particles is from 0.1 μm to 100 μm. When the size is larger than 100 μm, there is a risk that a resin becomes opaque when mixed therewith. Preferably, the size is from 0.2 μm to 30 μm.

The light/heat-absorbing fine particles 20 may be mixed with the whole of the plastic bottle container (preform) but may be mixed with a specific layer thereof using a multilayer preform, for example.

Then, the plastic bottle container 14 with which the light/heat-absorbing fine particles 20 are mixed is irradiated with a laser light. When irradiated with the laser light, the light/heat-absorbing fine particles 20 generate heat by the energy. By the heat, a resin surrounding the light/heat-absorbing fine particles 20 are heated and evaporated to form fine voids 21.

The refractive index of the voids shows a numeral the same as that of the air and thus is different from the refractive index (about 1.3 to about 1.5) of the surrounding plastic.

Therefore, by irradiating the plastic bottle container 14 with which the light/heat-absorbing fine particles 20 are mixed while an irradiating position of the leaser light is controlled, the voids 21 can be periodically formed, whereby a periodically arranged structure different in optical characteristics (refractive index), i.e., sites different in refractive index at regular intervals can be formed periodically.

According to the method, decoration can be conducted by mixing a relatively small amount of the light/heat-absorbing fine particles.

Figure 9A:
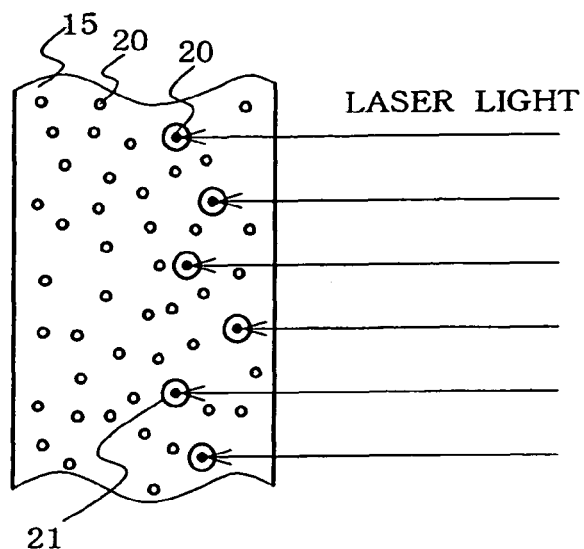
Figure 9B:
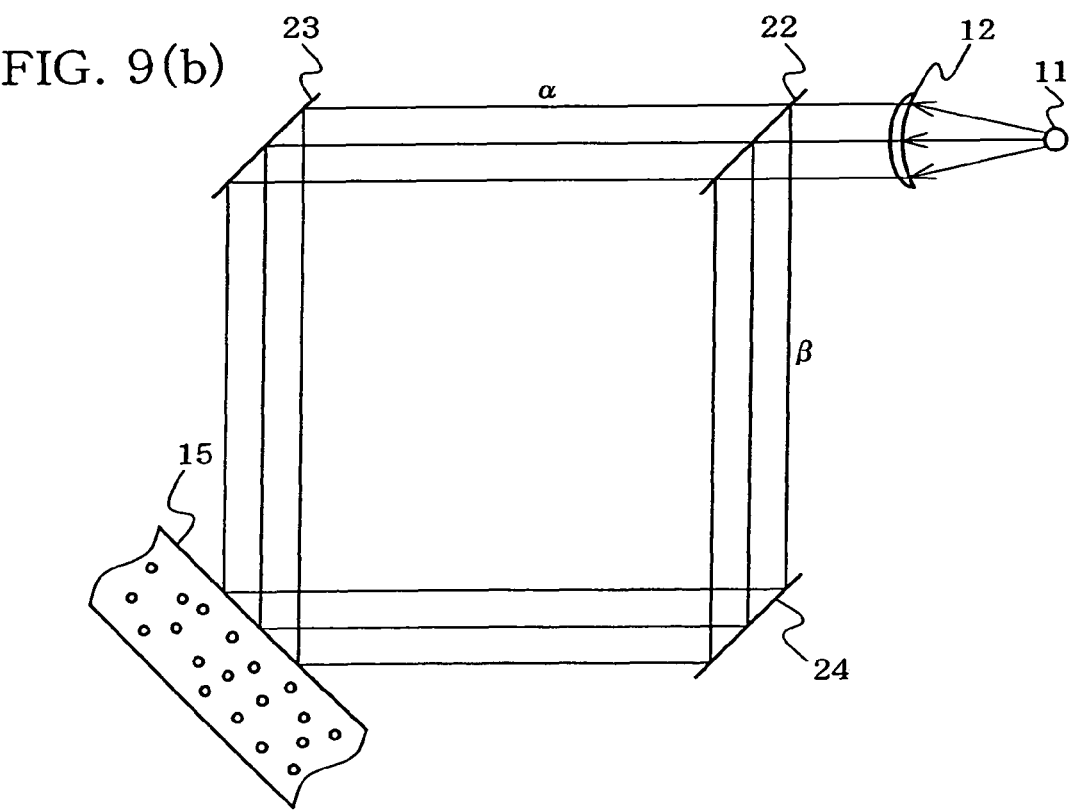
Figure 10:
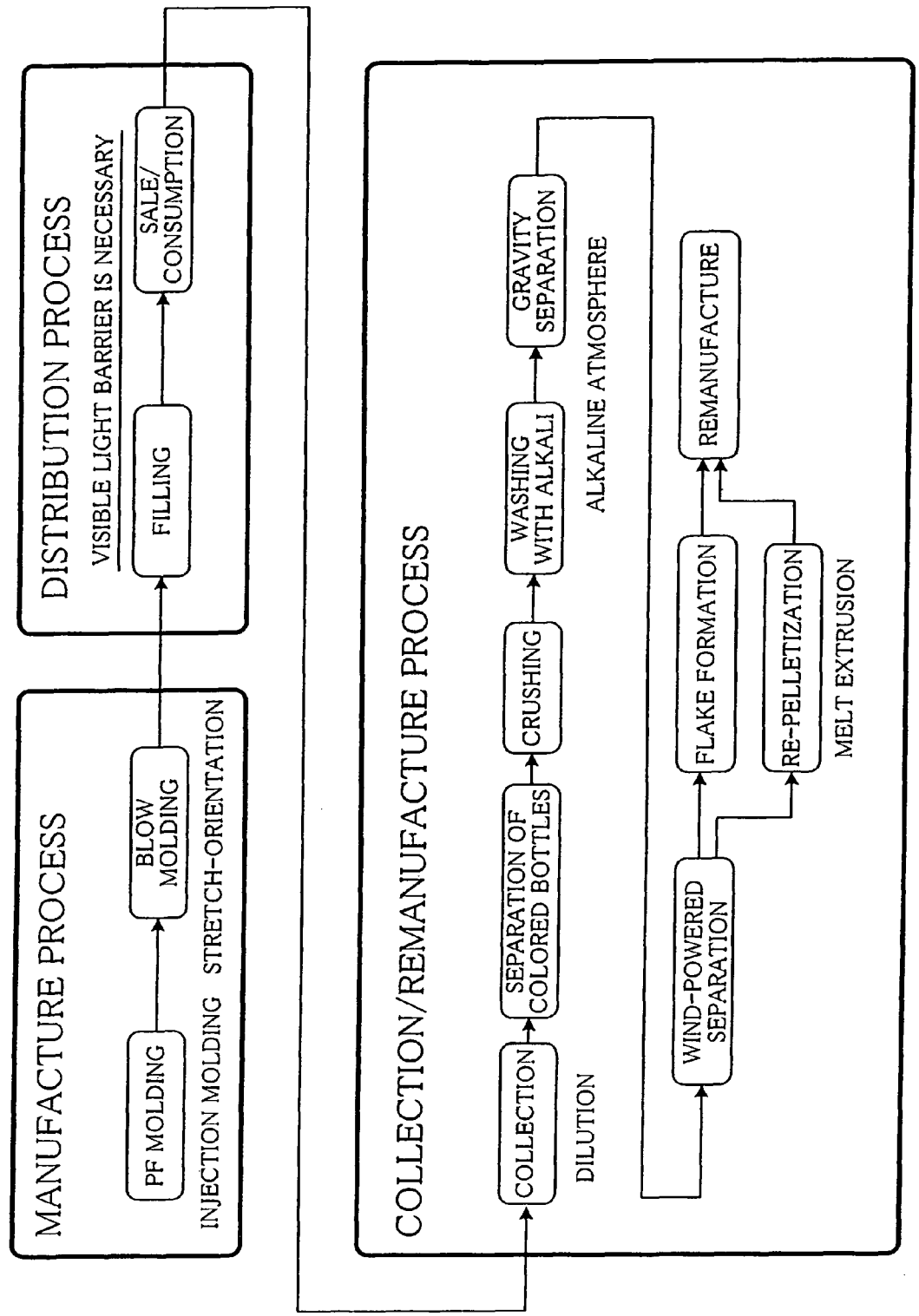
FIG. 10 is an explanatory drawing showing a flow from manufacture of PET bottles to recycle thereof (a flow of manufacture/recycle).
Figure 11:
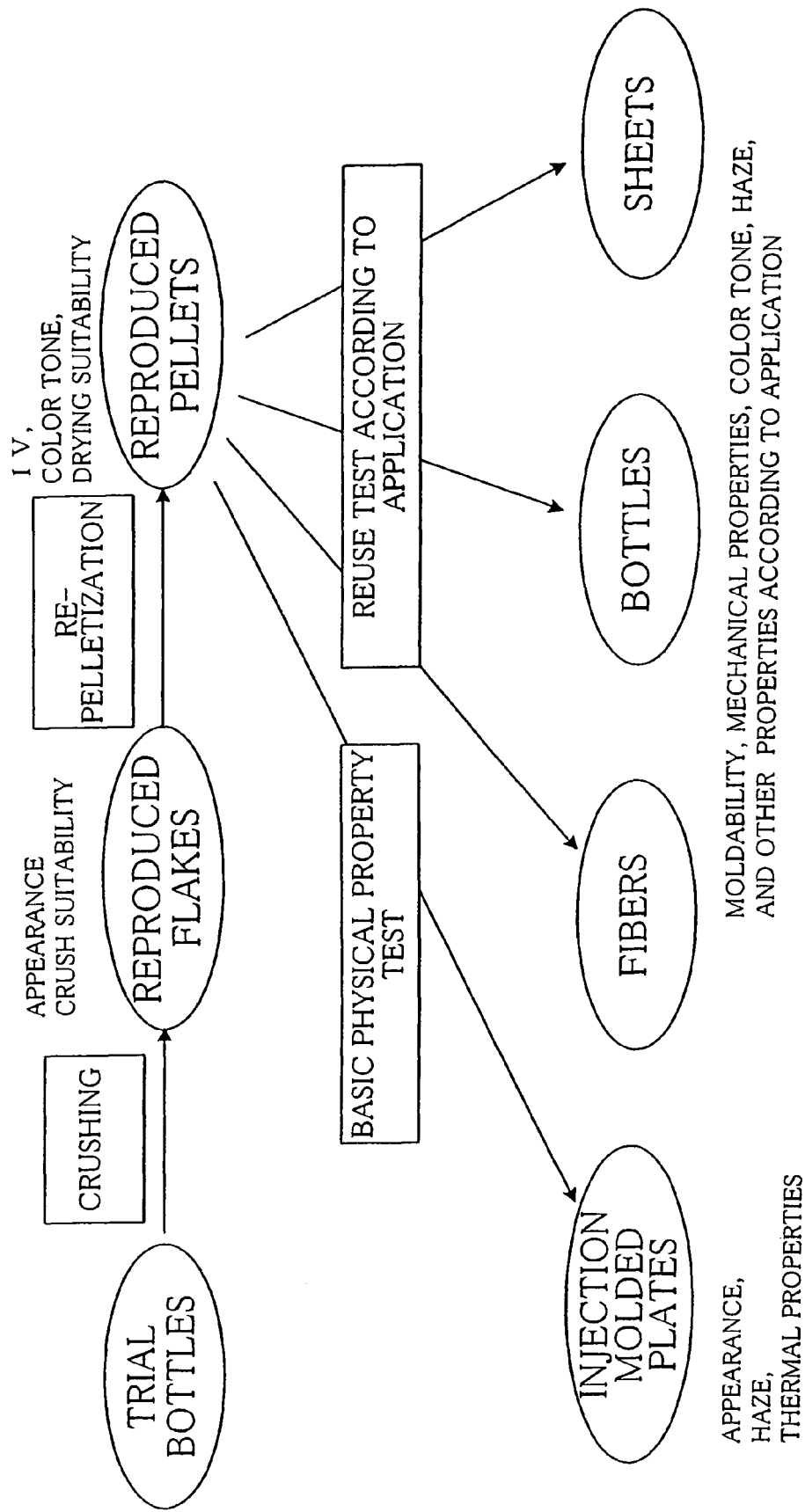
FIG. 11 is an explanatory drawing showing a flow of reuse suitability evaluation.

As methods for controlling the irradiating position of the leaser light, for example, there may be mentioned a method of irradiation of a spot laser light at regular intervals by a controlling method used in laser marking, as shown in FIG. 9(a), a controlling method utilizing the principle of interference fringes of a laser light, as shown in FIG. 9(b), and the like method.

The example utilizing the principle of interference fringes of the laser light will be described. In FIG. 9(b), the laser light radiated from a laser source 11 is converted into a parallel ray by a lens 12 and is divided into two lights α and β whose directions are different from each other by a half mirror 23. After the divided lights are reflected by mirrors 23 and 24, respectively, the wall 15 of the plastic container is irradiated therewith. At this time, interference fringes caused by optical path difference between the laser lights α and β are formed on the wall 15, and thus a periodical pattern is formed.

In addition to the embodiments shown in the above first to third ones, for example, by utilizing an self-organization effect of a fine periodical configuration which is generated by irradiation with a short-time pulse laser such as femtosecond laser, a periodically arranged structure can be also formed on a plastic bottle package (Masaki Hashida, Denki Gakkai Shi, Vol. 122, No. 11, pp. 749-753 (2002)).

As a method of forming a periodically arranged structure on the plastic bottle package, a fact that the optical characteristics of a plastic material depend on a wavelength can be utilized.

The optical characteristics of a plastic material, especially transmittance (or absorbance) depend on a wavelength.

A plastic material to a specific wavelength shows any property of transparency wherein transmittance is about 70% or more, semitransparency wherein transmittance is from 10% to less than 70%, or opacity wherein transmittance is less than 10%.

In the case that the plastic material shows transparency to a certain wavelength, an effect that the light imparts energy to the plastic package is weak.

To the contrary, in the case that the plastic material shows semitransparency or opacity to a certain wavelength, an effect that the light imparts energy to the plastic package is strong.

On the other hand, in the case that the plastic material shows opacity, the light only penetrates into a vicinity of the surface of the package.

To the contrary, in the case that the plastic material shows semitransparency or transparency, the light penetrates into the inside of the package.

When the wavelength dependency of the optical characteristics is utilized, by irradiation with a light having a wavelength to which the plastic material constituting the plastic package is semitransparent, a three-dimensional periodical configuration can be formed on the plastic package.

Moreover, by irradiation with a light having a wavelength to which the plastic material constituting the plastic package is opaque, a two-dimensional periodical configuration can be formed on the plastic package.

The periodical configuration thus once formed exhibits a physical coloring effect such as diffraction, interference, scattering, or the like even in a wavelength region where the plastic material shows transparency, whereby decoration can be achieved.

By using the method, decoration according to physical coloring can be achieved on a part or all part of the plastic package which is fundamentally transparent in a certain wavelength region.

For example, polyethylene terephthalate (PET) shows transparency in a wavelength range of 0.38 μm to 1.0 μm including the visible light region (0.4 μm to 0.7 μm), semitransparency in the near-ultraviolet light region (0.3 μm to 0.38 μm), and opacity in the deep-ultraviolet light region (0.3 μm or less).

Moreover, it generally shows transparency in an infrared light region of 1.0 μm or more, but there is a region showing opacity or semitransparency corresponding to absorption spectra of the molecule.

By irradiating a plastic package made of the PET material having such wavelength characteristics of light transmittance with a third harmonic wave of YAG laser having a wavelength of 0.355 μm or XeF excimer laser having a wavelength of 0.351 μm, which fall within a wavelength region showing semitransparency, a periodical configuration exhibiting physical coloring in the visible light region (0.4 μm to 0.7 μm) can be formed.

Moreover, by irradiating a plastic package made of the PET material having such wavelength characteristics of light transmittance with a fourth harmonic wave of YAG laser having a wavelength of 0.266 μm, KrF excimer laser having a wavelength of 0.248 μm, or ArF excimer laser having a wavelength of 0.193 μm, which fall within a wavelength range showing opacity, a periodical configuration exhibiting physical coloring in the visible light region (0.4 μm to 0.7 μm) can be formed.

As methods for forming the periodical configuration, any methods such as the above first to third embodiments and the above method of utilizing an self-organization effect of a fine periodical configuration can be used.

The above methods for forming the periodical configuration may be applied to monolayer plastic packages and multilayer plastic packages.

A multilayer plastic package may have a layer structure wherein a layer made of a plastic material which is transparent to a specific wavelength and a layer made of an opaque or semitransparent plastic material are adjacent to each other, and the thus constituted multilayer plastic package may be irradiated with a light having the specific wavelength from a transparent material layer side, so that the light passes through the transparent material layer. In consequence, a periodical configuration can be formed in an interface between the opaque material layer and the transparent material layer, or in the semitransparent material layer.

The optical characteristics of the plastic material are characteristics intrinsic in the plastic material, but an absorbent for a specific wavelength may be blended, whereby arbitrary optical characteristics can be imparted thereto.

Since the plastic package of the present invention does not use any colorant by chemical coloring, such as a pigment or a dye, the amount of the chemical substance to be used can be diminished and hence the container is a container small in environmental burden.

Moreover, since a periodically arranged configuration is formed by the difference in crystal structures or the formation of the voids and thus decoration is conducted by a physical coloring mechanism, decoloring can be easily effected by heating and kneading (re-pelletization) at recycle. Therefore, the container is decorated when used as a container but it becomes colorless and transparent after re-treatment, so that very good recycle properties are exerted.

Furthermore, unlike chemical coloring, a vivid color tone having deep color and gloss can be obtained and hence it is effective for differentiation of products by the decoration effect.

In this connection, in the first to third embodiments, decoration is applied to the previously molded plastic bottle container, but the preform may be molded into a bottle container as a final product after the preform is decorated by the above method.

Moreover, the method can be applied to not only a plastic bottle containers but also other packages such as cups, pouches, trays, tube containers, and the like.

[Fourth Invention: Reproduction Method]

A method of reproduction of the present invention comprises collecting a packaging structure and melting it to effect reproduction, wherein the melting for the reproduction is conducted at a temperature equal to or higher than the temperature at which the package is decolored.

The melting can be conducted, for example, using a melt extruder or the like.

In the reproduction process, steps necessary for manufacturing new materials and products, such as washing and separation are included, in addition to the melting.

The melting for the reproduction is conducted at a temperature equal to or higher than the temperature at which the regular configuration (thin-film laminate structure, crystal structure, voids, etc.) is destroyed, that is, the package is decolored.

For example, in the case that the temperature at which the regular configuration is destroyed is 220° C., the melting temperature is set at a temperature equal to or higher than 220° C. (e.g., 250° C.). Specifically, for example, in the case that the melting of a resin is conducted in a melt extruder, the set temperature of a flow path through which the resin is carried in a melted state is set at 250° C. or the like.

By conducting the melting at such a temperature, the package is decolored due to destruction of the regular configuration which is a coloring principle. Thereby, even when the package collected has been colored, the color can be removed at the melting stage.

On the other hand, at the manufacture step of the plastic package 1, the plastic package 1 is manufactured so that the colored configuration resulting from the thin-layer laminate structure 2 (or combination of the thin-layer laminate structure 2 and the other resin layer 3) is not destroyed.

Thereby, the plastic package of the present invention can possess the functions of the visible light barrier and decoration by coloration in the manufacture process. On the other hand, in the collection/remanufacture process, the plastic package can satisfy the evaluation standard of the reuse suitability evaluation through decoloring and thus becomes recyclable. Therefore, the reuse ratio of the packaging structure once distributed can be enhanced and hence recycle can be promoted.

EXAMPLES

Example 1

Polyethylene terephthalate (RT543CTHP) [Japanese Unipet Co., Ltd.] was fed to a hopper of an injection molding machine (NN75S) [manufactured by Niigata Engineering Co., Ltd.], and a monolayer preform (32 g) was molded at a plasticizing temperature of 280° C. Then, dip-coating was carried out by use of a polymethyl methacrylate (Wako Pure Chemical Industries, Ltd.)/acetone solution to form a polymethyl methacrylate film having a thickness of 3 μm on the outer surface of the preform. The preform having the thin film was subjected to biaxial stretch blow molding (stretch magnification: longitude 3.0×transverse 3.0, content of 500 ml), whereby a colored bottle was obtained.

Thereafter, the colored bottle was crushed into flakes in a crusher (Horai Co., Ltd., Model VC3-360), and the resultant flakes were fed to the above injection molding machine and molded into a sheet having a thickness of 1.5 mm at a plasticizing temperature of 280° C. At this time, the molded sheet was decolored.

Example 2

Polypropylene (FH1016) [Mitsui Sumitomo Polyolefin] was fed to a hopper of an extruder, and a monolayer direct blow bottle (21 g) was molded. Then, dip-coating was carried out in the same manner as in Example 1 to form a thin film having a thickness of 300 nm on a bottle wall. At this time, the bottle was colored.

The colored bottle which was thus manufactured was crushed and injection-molded in the same manner as in Example 1. At this time, the resultant injected sheet was decolored.

Comparative Example 1

The same procedure as in Example 1 was carried out except that a film thickness of polymethyl methacrylate on the outer surface of the preform was 20 μm, to mold a thin-film laminate bottle. At this time, coloring was not observed.

Example 3

A laminate film having an adhesive layer was applied by thermocompression onto the body surface of a bottle container formed by biaxial stretch blow molding in the same manner as in Example 1, to obtain a colored bottle. The colored bottle thus manufactured was crushed and injection-molded in the same manner as in Example 1. At this time, the resultant injected sheet was decolored.

The used laminate film was an alternate multilayer thin-film laminate film of polyethylene terephthalate and Nylon 6, and a color of the film changed in accordance with a view angle owing to thin-film interference. Moreover, a decoloring temperature of this film was 220° C.

Comparative Example 2

Polypropylene (FH1016) [Mitsui Sumitomo Polyolefin] was fed to a hopper of an extruder, and a monolayer direct blow bottle (25 g) was molded. Then, onto the body surface of the bottle container, the laminate film having the adhesive layer used in Example 1 was applied by thermocompression, to obtain a colored bottle.

Thereafter, this colored bottle was crushed in the same manner as in Example 1, and then a sheet having a thickness of 1.5 mm was prepared at a plasticizing temperature of 200° C. At this time, unmelted colored multilayer film flakes remained in the resin.

It is to be noted that as a method of forming a laminate film, there may be mentioned a multilayer extrusion molded article having a protective boundary layer and an extrusion molding apparatus described in Japanese PCT Patent Application Laid-open No. 501994/1996.

INDUSTRIAL APPLICABILITY

The present invention can provide a plastic package which can be easily recycled even when decorated. Furthermore, it can provide a method for decorating the same and a method for reproducing the same.

The invention claimed is:

1. A plastic package, comprising:
a main portion formed of crystalline resin; and
another portion having a periodic structure of a spot or a line arranged on a surface thereof, the spot or the line having different optical characteristics from the main portion,
wherein the periodic structure is arranged at a predetermined interval according to a color to be colored or a wavelength of a light to be shielded for at least 10 periods in a two-dimensional manner or a three-dimensional manner,
the periodic structure diffracts and interferes light such that the periodic structure forms the color, and said main portion includes an oriented crystalline portion with spherulite sites periodically arranged therein.

2. The plastic package according to claim 1, wherein the spherulite sites have refractive index different from that of the oriented crystalline portion.

3. The plastic package according to claim 1, wherein the main portion has convex portions having lens effects.

4. The plastic package according to claim 1, wherein the optical characteristics include a refractive index.

5. The plastic package according to claim 4, wherein the optical characteristics further include a reflection, a light transmittance, a light absorbance, or a polarization degree.

* * * * *